(12) United States Patent
Hao et al.

(10) Patent No.: US 12,509,109 B2
(45) Date of Patent: Dec. 30, 2025

(54) USING VECTOR CHART DATA WITH DISPLAY LIFECYCLES TO VISUALIZE AUTONOMOUS VEHICLE PROCESSESS

(71) Applicant: Intel Corporation, Santa Clara, CA (US)

(72) Inventors: Yan Hao, Shanghai (CN); Zhi Yong Zhu, Shanghai (CN); Lu Li, Shanghai (CN); Ciyong Chen, Shanghai (CN); Kun Yu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 613 days.

(21) Appl. No.: 17/598,172

(22) PCT Filed: May 31, 2019

(86) PCT No.: PCT/CN2019/089507
§ 371 (c)(1),
(2) Date: Sep. 24, 2021

(87) PCT Pub. No.: WO2020/237622
PCT Pub. Date: Dec. 3, 2020

(65) Prior Publication Data
US 2022/0176881 A1   Jun. 9, 2022

(51) Int. Cl.
*B60W 60/00* (2020.01)
*B60K 35/10* (2024.01)
*B60K 35/22* (2024.01)

(52) U.S. Cl.
CPC ........... *B60W 60/001* (2020.02); *B60K 35/10* (2024.01); *B60K 35/22* (2024.01)

(58) Field of Classification Search
CPC .................................................. B60W 60/001
See application file for complete search history.

(56) References Cited

U.S. PATENT DOCUMENTS 8,346,426 B1 * 1/2013 Szybalski .............. B60K 35/60
701/28
2018/0058879 A1 3/2018 Tayama et al.
(Continued)

FOREIGN PATENT DOCUMENTS

CN 105261224 A 6/2016
CN 107428249 A 12/2017
(Continued)

OTHER PUBLICATIONS

International Search Report and Written Opinion for International Patent Application No. PCT/CN2019/089507, mailed Nov. 27, 2019, 10 pages.
Alexey Dosovitskiy et al., "CARLA: An Open Urban Driving Simulator", Robot Learning, 2017, 16 pages, Mountain View US.
Haoyang Fan et al., "Baidu Apollo EM Motion Planner", arXiv:1807.08048v1, Jul. 20, 2018, 15 pages.
(Continued)

*Primary Examiner* — Wade Miles
*Assistant Examiner* — Aaron G Cain
(74) *Attorney, Agent, or Firm* — Schwegman Lundberg & Woessner, P.A.

(57) ABSTRACT

Systems, apparatuses and methods (30) may provide for technology that stores data associated with a plurality of intermediate operations in an autonomous vehicle process (32), generates a visualization output based at least partly on the data (34), and changes a magnification level of the visualization output based on user input (38), the visualization output is generated further based on parameter input and the data includes vector chart data.

16 Claims, 14 Drawing Sheets

(56) References Cited

U.S. PATENT DOCUMENTS

| | | | |
|---|---|---|---|
| 2018/0074497 A1* | 3/2018 | Tsuji | B60W 50/082 |
| 2018/0321843 A1* | 11/2018 | Giannotti | G06F 3/04886 |
| 2018/0354419 A1 | 12/2018 | Choi et al. | |
| 2019/0092344 A1 | 3/2019 | Makabe | |
| 2020/0301435 A1* | 9/2020 | Phillips | G05D 1/0217 |

FOREIGN PATENT DOCUMENTS

| | | |
|---|---|---|
| CN | 109035861 A | 12/2018 |
| CN | 109591828 A | 4/2019 |
| CN | 109703572 A | 5/2019 |
| DE | 102018112156 | 3/2019 |
| EP | 3269609 A1 | 1/2018 |
| EP | 3977339 | 4/2022 |
| WO | 2019008703 | 1/2019 |
| WO | 2020237622 | 12/2020 |

OTHER PUBLICATIONS

Kichun Jo et al., "Development of Autonomous Car—Part I: Distributed System Architecture and Development Process", IEEE Transactions on Industrial Electronics, Dec. 2014, 11 pages, vol. 16 No. 12.

"GitHub—ApolloAuto/apollo: An open autonomous driving platform", GitHub, retrieved from <github.com/ApolloAuto/apollo>, May 1, 2019, 10 pages.

"International Application Serial No. PCT CN2019 089507, International Preliminary Report on Patentability mailed Dec. 9, 2021", 6 pgs.

"European Application Serial No. 19931191.1, Extended European Search Report mailed Dec. 20, 2022", 7 pgs.

"European Application Serial No. 19931191.1, Response filed Jul. 11, 2023 to Extended European Search Report mailed Dec. 20, 2022", 9 pgs.

\* cited by examiner

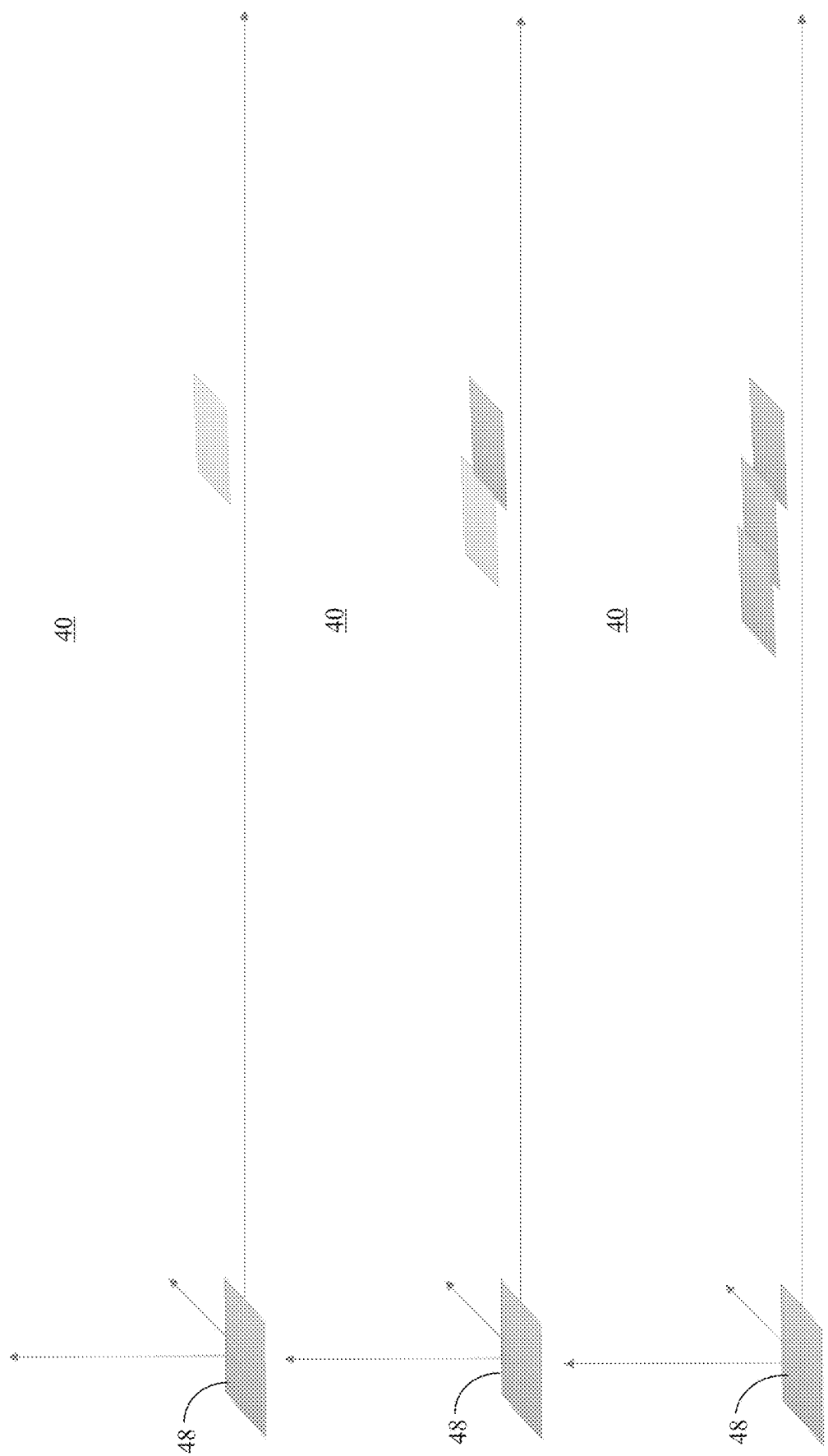

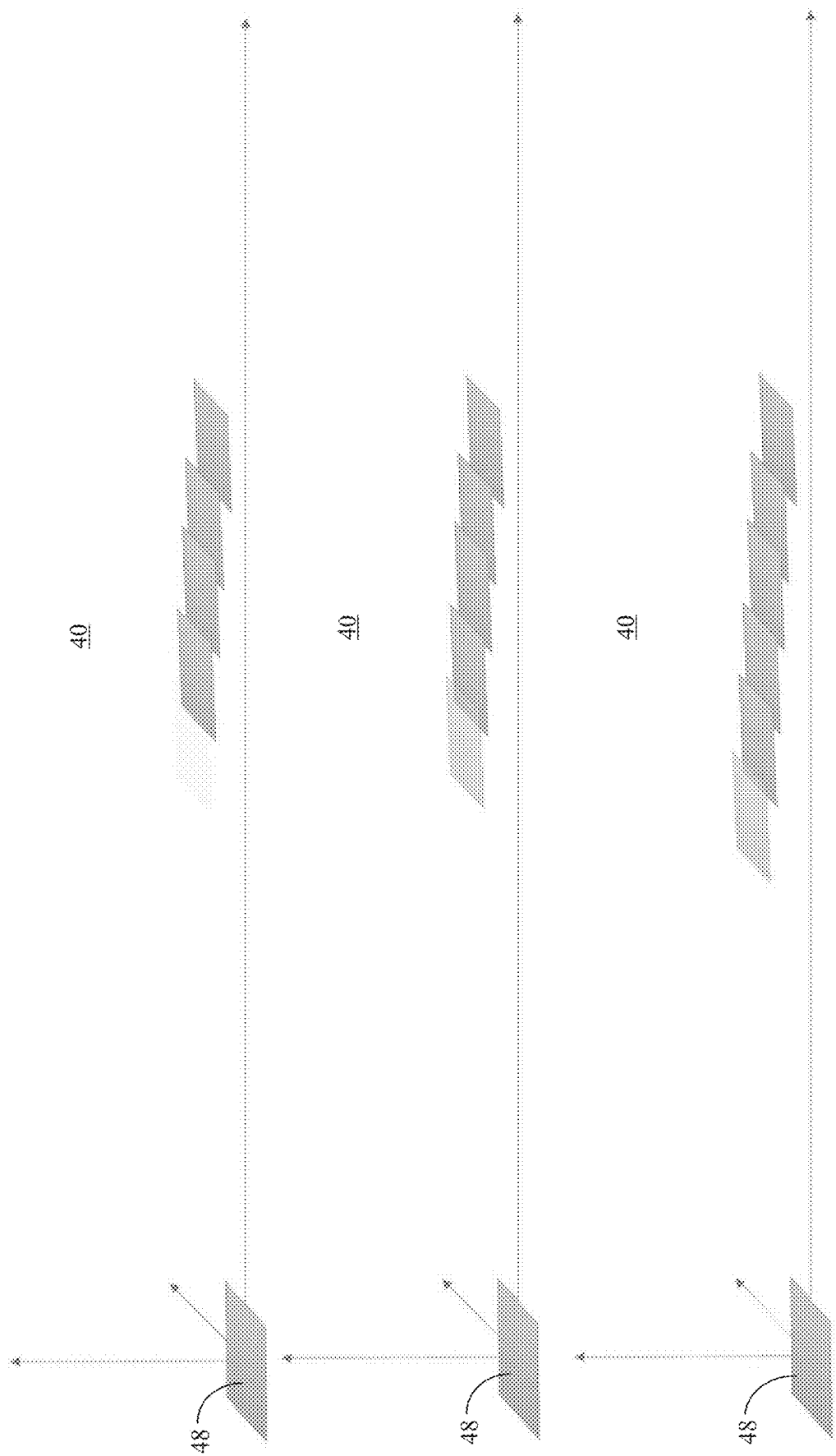

USING VECTOR CHART DATA WITH DISPLAY LIFECYCLES TO VISUALIZE AUTONOMOUS VEHICLE PROCESSESS

CROSS REFERENCE TO RELATED APPLICATIONS

This application is a U.S. National Phase Patent Application which claims benefit to International Patent Application No. PCT/CN2019/089507 filed on May 31, 2019.

TECHNICAL FIELD

Embodiments generally relate to autonomous vehicles. More particularly, embodiments relate to using vector chart data with display lifecycles to visualize autonomous vehicle processes.

BACKGROUND

Autonomous vehicles are beginning to enable the driverless transport of passengers and cargo from one location to another on an increasing scale. Visualization systems such as the Baidu Apollo system may provide for the display of objects detected during operation of an autonomous vehicle as well as final trajectories taken by the vehicle. Certain activities, however, such as calibration (e.g., during development and/or maintenance of the autonomous vehicle) and crash investigation may be difficult to perform given the limited information provided by conventional visualization systems.

BRIEF DESCRIPTION OF THE DRAWINGS

The various advantages of the embodiments will become apparent to one skilled in the art by reading the following specification and appended claims, and by referencing the following drawings, in which:

FIGS. 5A-5G are illustrations of examples of a visualization output having elements with limited display durations according to embodiments;

DESCRIPTION OF EMBODIMENTS

Figure 1:
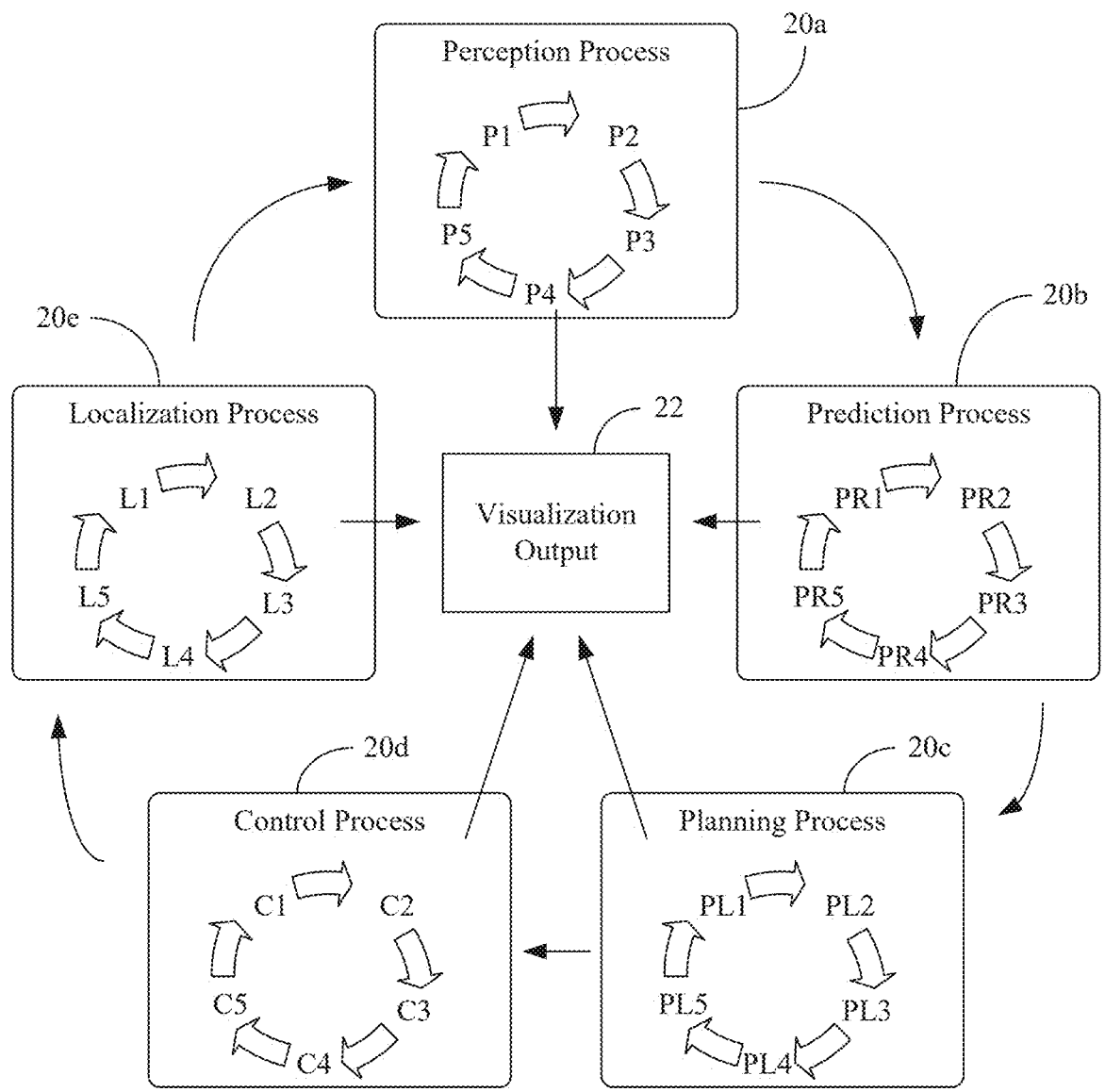
FIG. 1 is an illustration of an example of a set of autonomous vehicle processes according to an embodiment.

Turning now to FIG. 1, a set of autonomous vehicle processes 20 (20a-20e) is shown. The processes 20 may be repeatedly used in a cyclical/iterative fashion during the operation of an autonomous vehicle such as, for example, a car, truck, aircraft, and so forth. In the illustrated example, the vehicle conducts a perception process 20a that includes a plurality of intermediate operations (P1-P2) that are also cyclical. The intermediate operations of the perception process 20a may enable the vehicle to perceive various objects (e.g., other vehicles, pedestrians, signs and/or other obstacles) in the surrounding environment. In an embodiment, data (e.g., vector chart data that represents a database of information) associated with the intermediate operations is stored and used to generate a visualization output 22.

As will be discussed in greater detail, the use of data from the intermediate operations enables the visualization output 22 to be more advantageous to the end user. For example, during calibration of the autonomous vehicle, a developer might vary parameters and/or settings of the intermediate operations to determine the result of the perception process 20a at intermediate stages of the perception process 20a. Moreover, the underlying data used to generate the visualization output 22 may be vector chart data encoded with additional information to ensure that magnification/zoom operations are accurate. In such a case, the user may readily change the magnification level of the visualization output 22 to view the specifics of the intermediate operations at varying levels of detail (e.g., in connection with an investigation into a crash of the autonomous vehicle). In one example, a "lifecycle" (e.g., limited display duration) is assigned to the elements of the visualization output 22 (e.g., based on temporal position and/or candidacy status) to prevent the overlapping of a high number of visible elements for an extended period of time. Such an approach is particularly advantageous given the large data sets typically processed by an autonomous vehicle.

Similarly, the vehicle may conduct a prediction process 20b to estimate the future positions (e.g., in the Cartesian/world coordinate system) of objects previously perceived during the perception process 20a. In the illustrated example, the prediction process includes a plurality of intermediate operations (PR1-PR5). Again, data associated with the intermediate operations of the prediction process 20b may be stored and used to generate the visualization output 22, wherein the visualization output 22 is more advantageous to the end user in terms of, for example, calibration, crash investigation, and so forth.

The illustrated set of processes 20 also includes a planning process 20c having a plurality of intermediate operations (PL1-PL5) to select a trajectory (e.g., current lane, lane change, etc.) of the autonomous vehicle based on the future positions of objects previously estimated during the prediction process 20b. Data associated with the intermediate operations of the planning process 20c may be stored and used to generate the visualization output 22, wherein the visualization output 22 continues to be more advantageous to the end user in terms of, for example, calibration, crash investigation, and so forth. Similar benefits may be achieved with regard to a control process 20d having a plurality of intermediate operations (C1-C5) to operate the autonomous vehicle along the trajectory selected by the planning process 20c and a localization (e.g., routing) process 20e having a plurality of intermediate operations (L1-L5) to select a future route for the autonomous vehicle based on the results of the control process 20d. Other types of autonomous vehicle processes may also be used.

Figure 2:
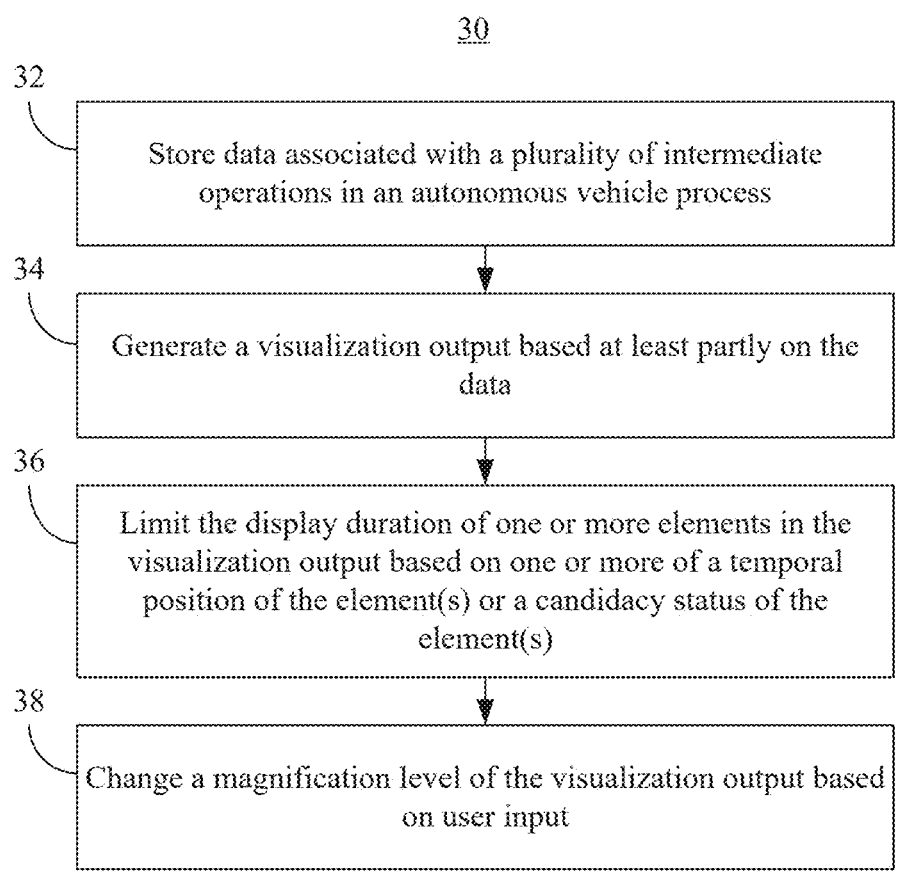
FIG. 2 is a flowchart of an example of a method of operating a performance-enhanced computing system according to an embodiment.

FIG. 2 shows a method 30 of operating a performance-enhanced computing system. The method 30 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 30 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 32 provides for storing data associated with a plurality of intermediate operations in an autonomous vehicle process such as, for example, a perception process, prediction process, planning process, control process, localization process, etc. In one example, block 32 includes storing the data to a non-volatile memory (NVM) and/or volatile memory. In an embodiment, the data is vector chart data that facilitates zooming operations. For example, the vector chart data may be encoded with additional information to ensure that the magnification and reduction of lattice points and navigation curves is accurate. Block 34 generates a visualization output based at least partly on the stored data. Block 34 may generate the visualization output further based on parameter input such as, for example, cost function weights, initial velocity, initial acceleration, vehicle dynamics, regulations, formulas and/or other system parameters. In an embodiment, one or more of the parameters may be queried by the user for comparative analysis purposes.

Figure 3:
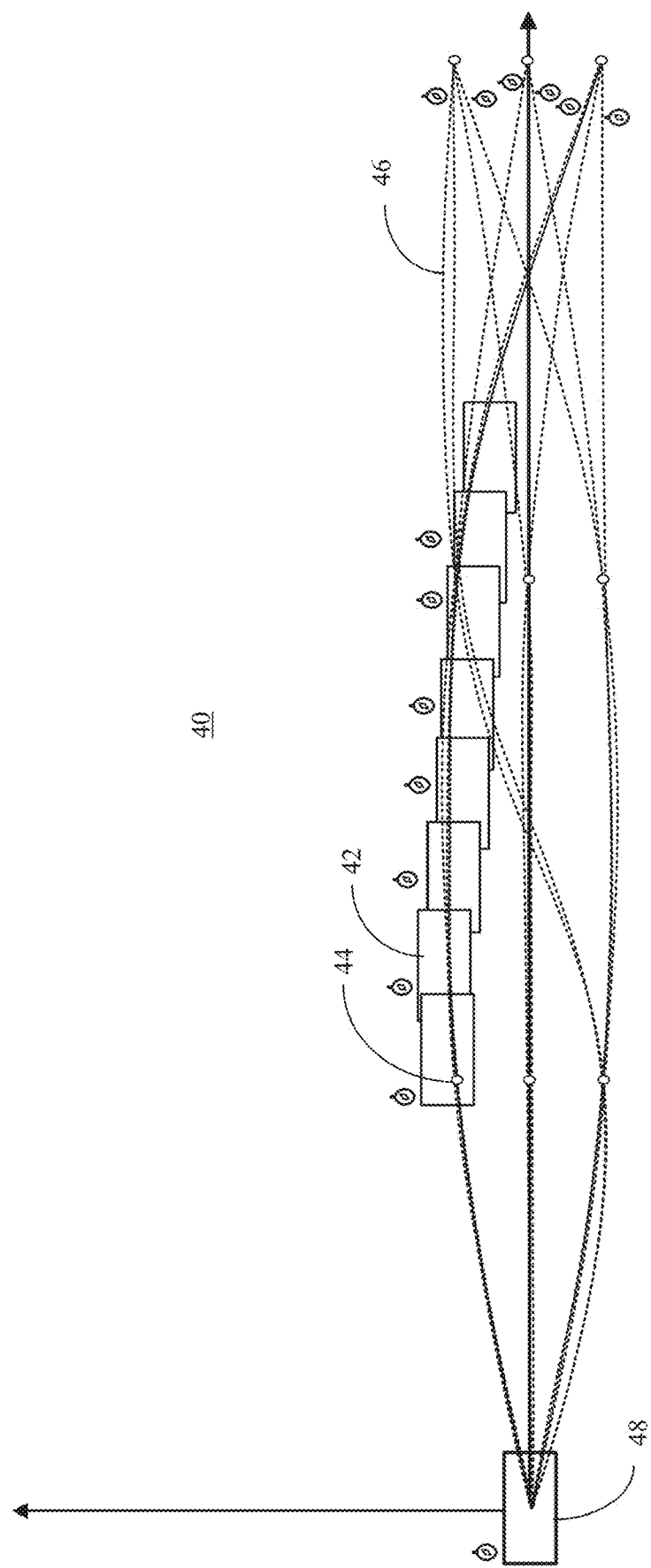
FIG. 3 is an illustration of an example of a visualization output according to an embodiment.

The display duration of one or more elements in the visualization output may be limited at block 36 based on one or more of the relative temporal position or the candidacy status of the element(s). For example, during the visualization of a planning process, oncoming vehicles may have a longer lifecycle than lattice points, which are sampled based on the location of the oncoming vehicles over time. Additionally, the lifecycle might be relatively short for a candidate path that is eliminated from contention relatively early in the planning process. FIG. 3 shows an example of a visualization output 40 (e.g., a plan view representation of a driving environment) for a planning process in which an autonomous vehicle 48 is presented along with elements such as a perceived obstacle 42 (e.g., oncoming vehicle), a lattice point 44, and a candidate navigation path 46. As best shown in FIGS. 5A-5G, the elements may be assigned a display duration (e.g., lifecycle) that prevents the overlapping of a high number of elements for an extended period of time during playback of the visualization output 40.

Figure 4:
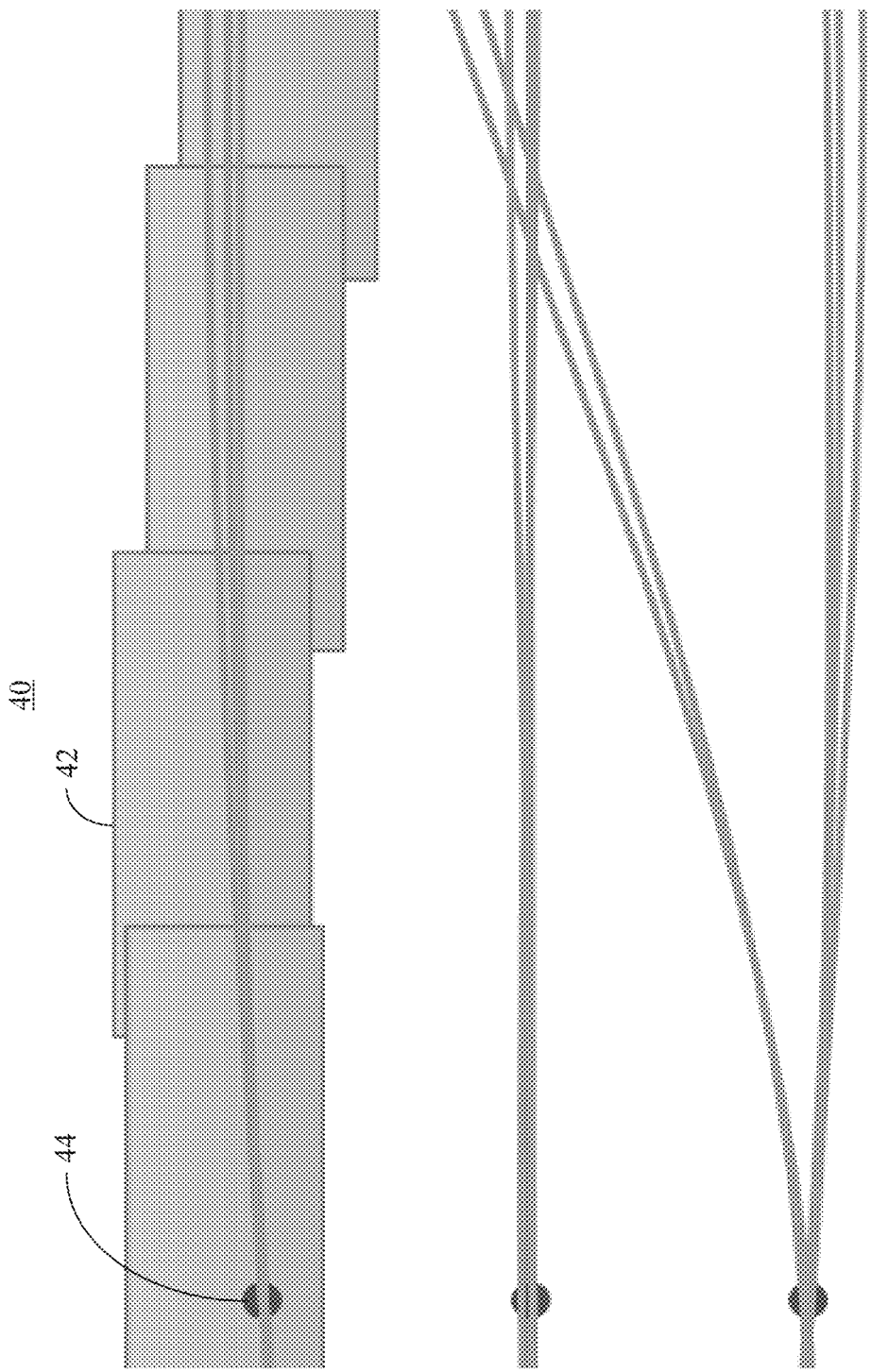
FIG. 4 is an illustration of an example of the visualization output from FIG. 3 with a modified magnification level according to an embodiment.

With continuing reference to FIGS. 2 and 4, block 38 changes a magnification level of the visualization output 40 based on user input. In the illustrated example, the perceived obstacle 42 and the lattice point 44 are viewed accurately at a relatively high magnification level in response to a user request to increase the magnification level. The illustrated method 30 therefore enhances performance by enabling the user to vary parameters and/or settings of the intermediate operations and determine the result of intermediate operations of an autonomous vehicle process. As a result, more effective calibration may be achieved. Moreover, the user may readily change the magnification level of the visualization output 40 to view the specifics of the intermediate operations at varying levels of detail (e.g., in connection with a change in settings/parameters or an investigation into a crash of the autonomous vehicle). Additionally, the assignment of a lifecycle (e.g., limited display duration) to the elements of the visualization output 40 prevents the overlapping of a high number of elements for an extended period of time.

Figure 5C:
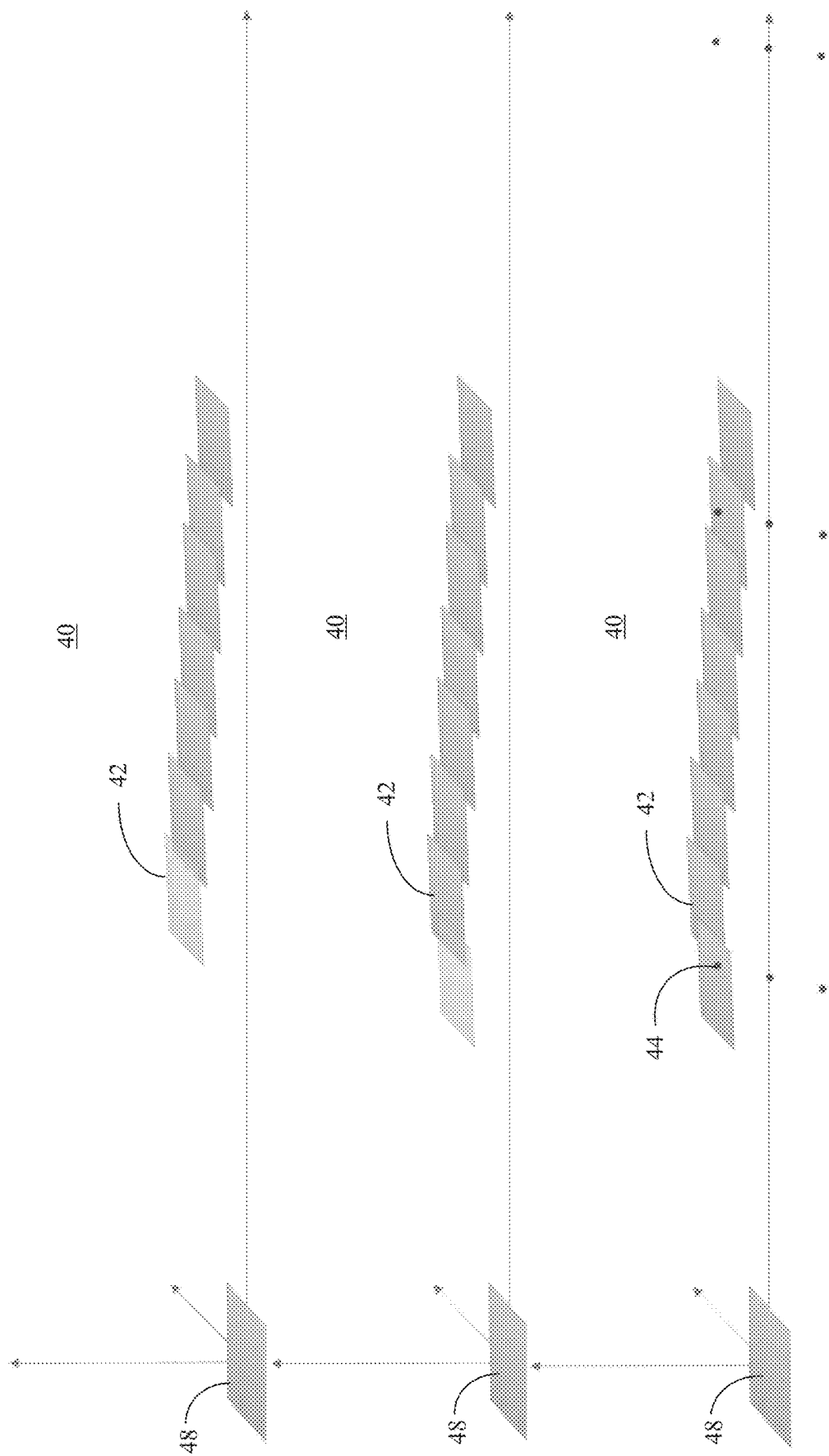
Figure 5D:
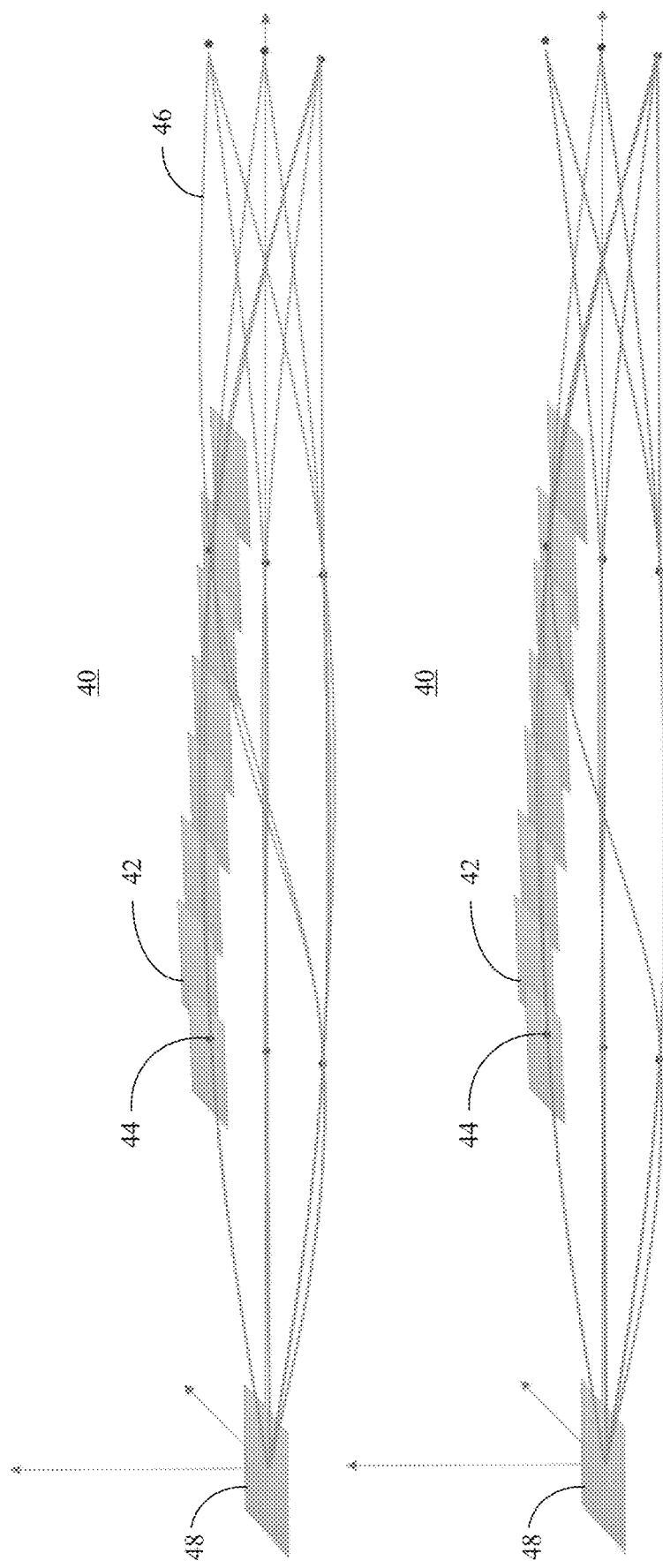
Figure 5E:
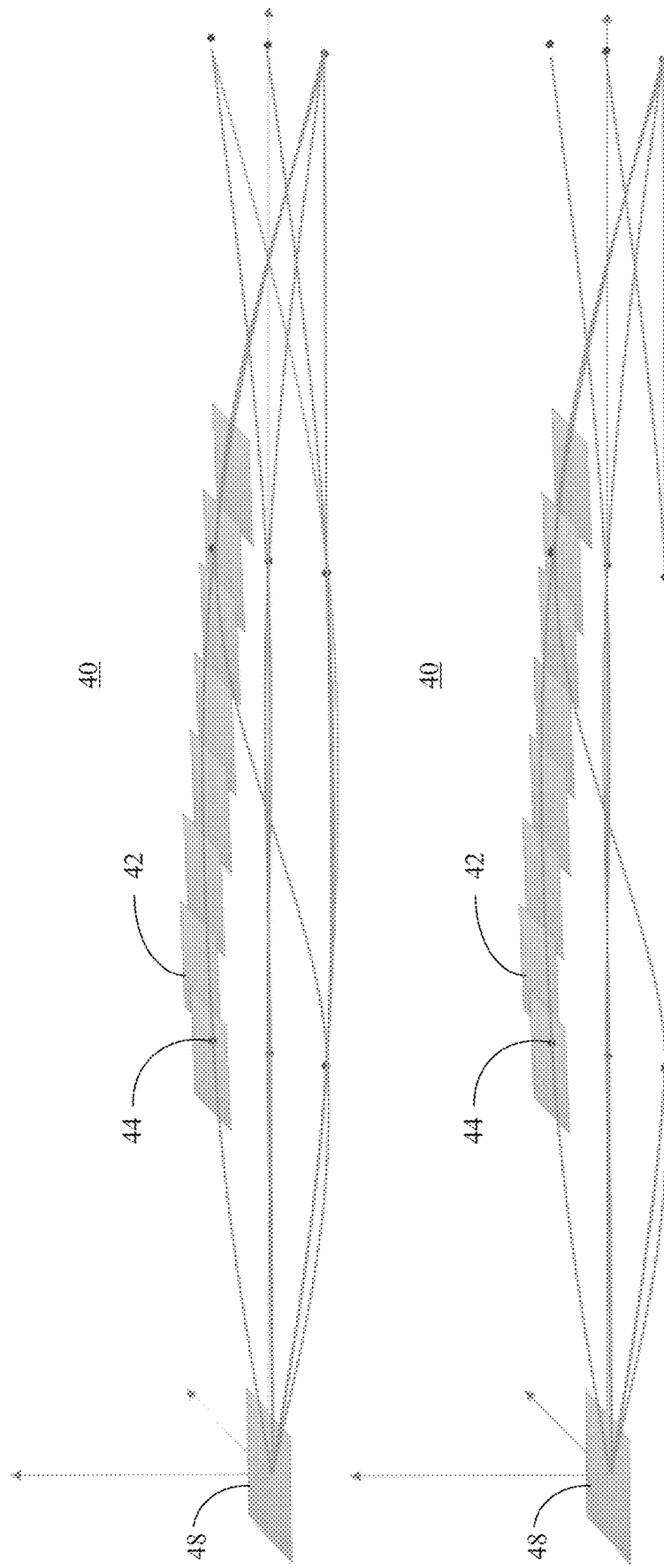
Figure 5F:
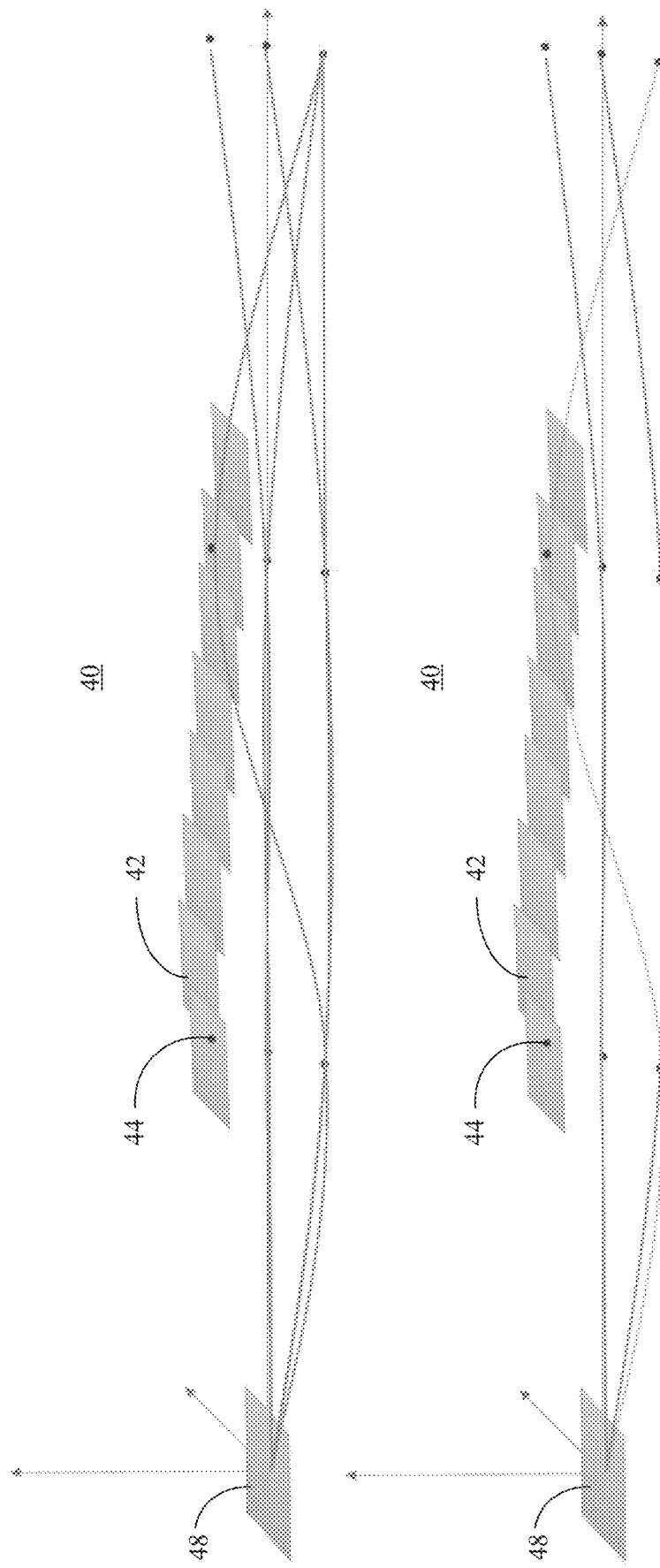
Figure 5G:
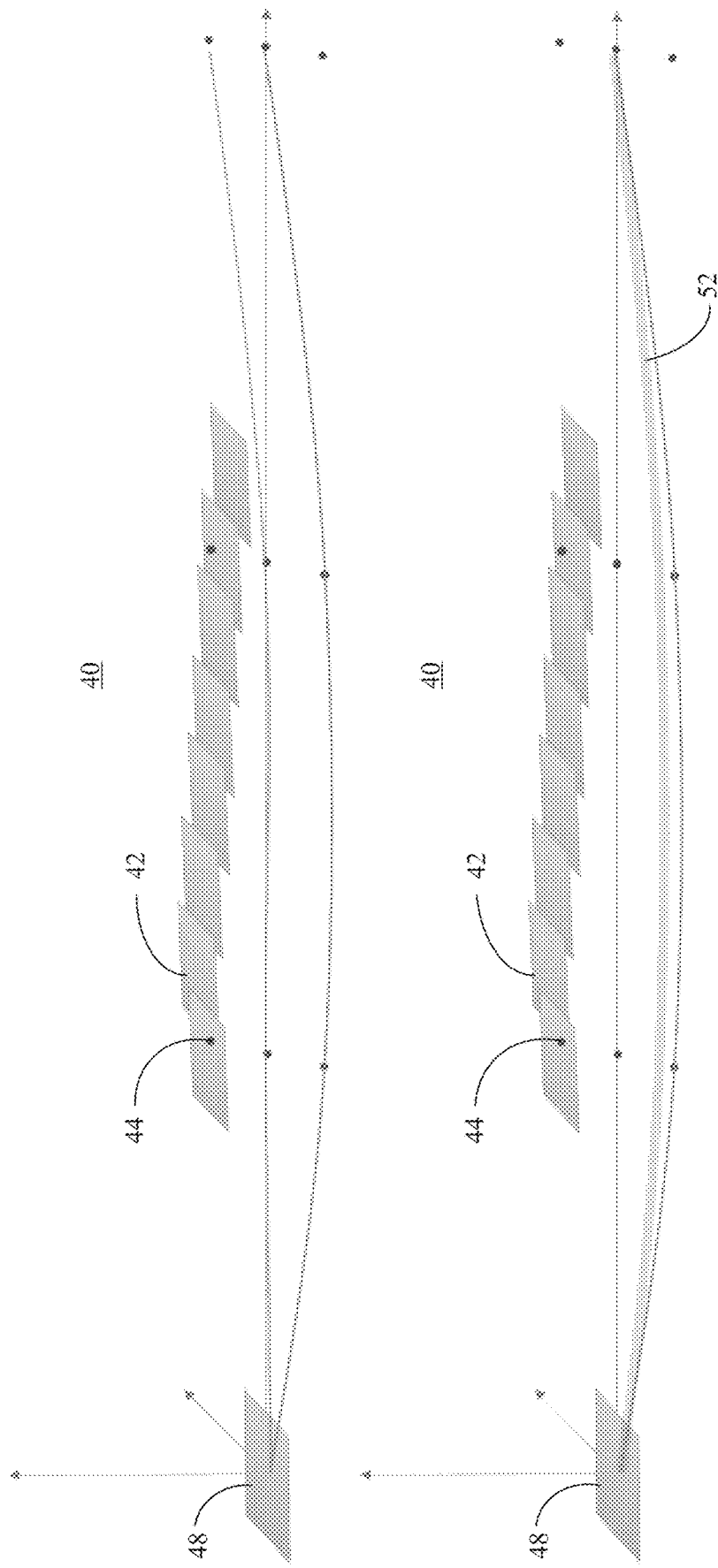

To further highlight the advantages of the present disclosure, a planning process such as the planning process 20c (FIG. 1) is described in greater detail with reference to FIGS. 5A-5G. In one example, the planning process will:

Predict and project the oncoming obstacle 42 in the Cartesian coordinate system;

Sample lattice points such as, for example, the lattice point 44 based on system parameters and the real-time environment at the time (e.g., nine points in the illustrated example, as best shown in FIGS. 5C-5G);

Generate candidate paths such as, for example, the candidate navigation path 46 by connecting the lattice points, as best shown in FIG. 5D (e.g., nine candidate paths in the illustrated example);

Eliminate candidate paths that fail to meet one or more requirements, where the eliminated candidate paths disappear from the visualization output 40 upon expiration of the limited display duration, as best shown in FIGS. 5E-5G. In the illustrated example, the temporal position (e.g., relative location on the time scale) and candidacy status (e.g., eliminated or not eliminated) of the elements is used to limit the respective display durations;

Select the last remaining candidate path; and

Refine the selected path to generate a final path profile such as a profile 52, as shown in FIG. 5G.

In one example, the planning process is divided into eight intermediate operations as shown in Table I.

TABLE I

| Operation | Details |
| --- | --- |
| 1 | Generate reference line |
| 2 | SL (Station-Lateral) Projection ("E-Operation") |
| 3 | Path Planning ("M-Operation") |
| 4 | ST (Station-Time) Projection ("E-Operation") |
| 5 | Speed Planning ("M-Operation") |
| 6 | Get path profile "l = f(s)" and speed profile "s = S(t)" based on one Frenet frame |
| 7 | Cycle. May jump to Operation3 |
| 8 | Reference Line Trajectory Decider |

Where the following terminology applies.

Frenet Coordinate System: the Frenet-Serret Coordinate System is a type of coordinate System in which Frenet-Serret formulas constantly rotate the coordinate system as an observer moves along the curve. In an embodiment, this coordinate system is always non-inertial. Often used in robot systems and autonomous driving systems, this coordinate system constructs a Frenet frame based on a curve (e.g., a reference line).

Station: longitudinal coordinates in Frenet Coordinate System.

Lateral: horizontal ordinate in Frenet Coordinate System.

Reference line: the line that is used to build Frenet Coordinate System.

Figure 6:
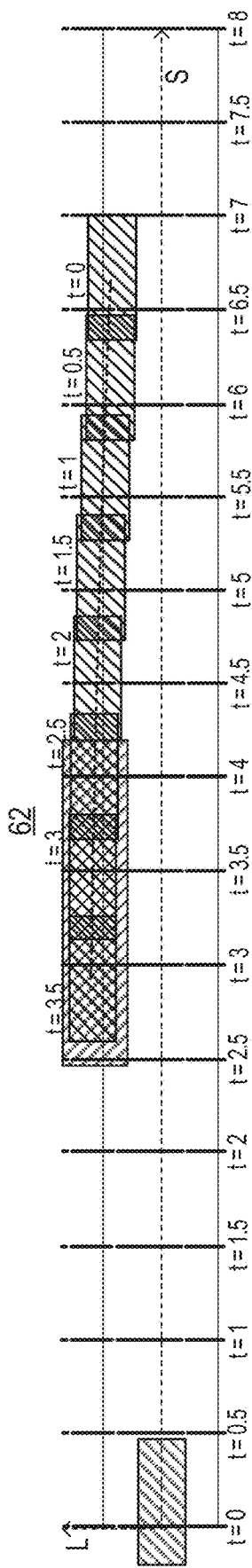
FIG. 6 is a plot of an example of a station-lateral projection according to an embodiment.

SL Coordinate System: this coordinate system is used for obstacle SL projection and path planning, as best shown in the SL projection 62 of FIG. 6.

Figure 8:
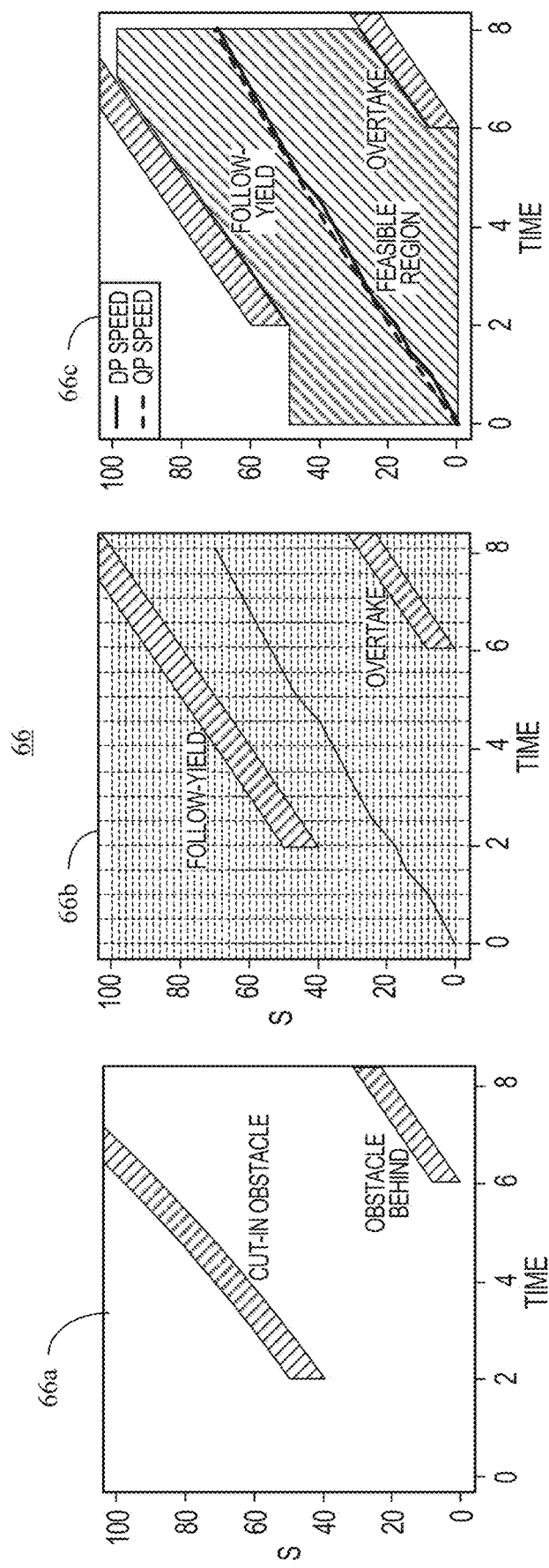
FIG. 8 is a plot of examples of a station-time projection, a speed plan, and a refined speed plan according to an embodiment.

ST Coordinate System: this coordinate system is used to conduct obstacle ST projection and speed planning, as best shown in the charts 66 (66a-66c) of FIG. 8.

Operation 1: Generate Reference Line

1) A reference line generator produces several candidate lane-level reference lines based on the high-definition map and navigation information from the routing module.

2) Construct a Frenet frame based on a specified reference line. If, for example, there are two reference lines that generate two Frenet frames, then conduct the operations below based on each Frenet frame.

Operation 2: SL Projection

1) With reference to FIG. 6, static obstacles, low-speed dynamic obstacles and oncoming obstacles are projected to the SL coordinate system based on the reference line.

2) Static obstacles are projected directly based on a Cartesian-Frenet frame transformation, while dynamic obstacles are described with several moving trajectories by a prediction process such as, for example, the prediction process 20b (FIG. 1).

Accordingly, the planning process may project low-speed dynamic obstacles and oncoming obstacles into the SL coordinate system at each time instance by the previous autonomous vehicle cycle planning trajectory and the obstacles prediction trajectories.

3) The high-speed obstacle scenario may be covered by a suitable parallel lane-change strategy (not shown).

Operation 3: Path Planning

Find an optimal function of lateral coordinate l=f(s) with respect to station coordinates in nonconvex SL space. This operation includes a dynamic programming (DP) procedure and a spline-based quadratic programming (QP) procedure. Quadratic programming is a nonlinear process of solving a special type of mathematical optimization problem—specifically, a (linearly constrained) quadratic optimization problem. That is, the problem of optimizing (e.g., minimizing or maximizing) a quadratic function of several variables subject to linear constraints on the variables.

Figure 7:
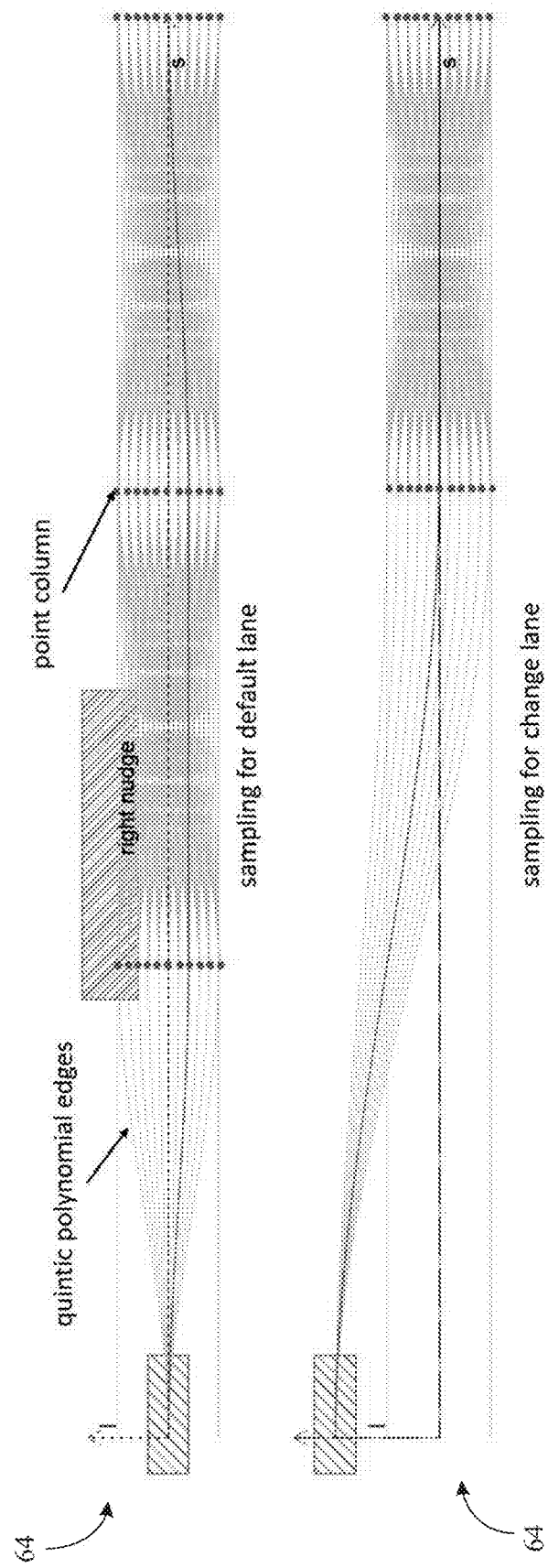
FIG. 7 is a plot of examples of a lattice sampling for a default lane and a lane change according to an embodiment.

1) Turning now to FIG. 7, the planning process conducts a lattice sampling 64 and connects these points between different columns by quintic polynomial edges. If, for example, there are eleven points in each point column, overall, there are 1452 (11×11×11+11×11) candidate paths.

2) The above operation produces a set of candidate paths, which are evaluated by the summation of a cost function. The total cost function of a candidate path is a linear combination of smoothness, obstacle avoidance and lane cost functional:

$$C_{total}(f(s)) = C_{smooth}(f) + C_{obs}(f) + C_{guidance}(f)$$

$$C_{smooth}(f) = w_1 \int (f'(s))^2 ds + w_2 \int (f''(s))^2 ds + w_3 \int (f'''(s))^2 ds$$

Where f'(s) represents the heading difference between the lane and ego car; f''(s) represents the curvature of the path; f'''(s) represents the derivate of the curvature.

$$C_{obs}(f) = \begin{cases} 0, & d > d_n, \\ C_{nudge}(d - d_c), & d_c \leq d \leq d_n, \\ C_{collision} & d < d_c \end{cases}$$

Where $C_{nudge}$ is defined as monotonically decreasing function, $d_c$ is set to leave a buffer for safety considerations, the nudge range $d_n$ is negotiable based on scenario, and $C_{collision}$ is the collision cost with a large value to help detect infeasible paths.

$$C_{guidance}(f) = \int (f(s) - g(s))^2 ds$$

Where g (s) represents the guidance line.

3) Find the lowest cost path through a DP search with the help of the total cost function above. Eventually, a feasible tunnel is generated based on the selected path.

4) The QP procedure is a refinement of the DP procedure and will generate a smooth path within the feasible tunnel above by optimizing the objective function below:

$$C_s(f) = w_1 \int (f'(s))^2 ds + w_2 \int (f''(s))^2 ds + w_3 \int (f'''(s))^2 ds + w_4 \int (f(s) - g(s))^2 ds$$

Where g(s) is the DP path result and f'(s), f''(s), f'''(s) are related to the heading, curvature, and derivative of curvature, respectively. The objective function describes the balance between nudging obstacles and smoothness.

Eventually, a path profile l=f(s) will be obtained for the autonomous vehicle. Next, a speed profile s=S(t) is obtained.

Operation 4: ST Projection

Turning now to FIG. 8, all obstacles, including high-speed, low-speed and oncoming obstacles are projected as an ST projection 66a into the ST coordinate system.

Operation 5: Speed Planning

In the DP "Speed Optimizer," obstacle information is first discretized into grids on the ST graph. The sequence $(t_0, t_1, \ldots, t_n)$ is denoted as equally spaced evaluated instances on the time axis with interval dt. A piecewise linear speed profile function is represented as $S = (s_0, s_1, \ldots, s_n)$ on the grids. The derivatives are approximated by a finite difference method:

$$S'_i = v_i \approx \frac{s_i - s_{i-1}}{dt}; \quad S''_i = a_i \approx \frac{s_i - 2s_{i-1} + s_{i-2}}{(dt)^2};$$

$$S'''_i = j_i \approx \frac{s_i - 3s_{i-1} - 3s_{i-2} + s_{i-3}}{(dt)^3}$$

2) Optimize the cost functional below in the ST graph.

$$C_{total}(S) = w_1 \int_{t_0}^{t_n} g(S' - V_{ref}) dt + w_2 \int_{t_0}^{t_n} (S'')^2 dt + w_3 \int_{t_0}^{t_n} (S''')^2 dt + w_4 C_{obs}(S)$$

Where $V_{ref}$ is the reference speed, which is determined by road speed limits, curvature and other traffic regulations, S'' and S''' are acceleration and jerk (e.g., which associated terms describe the smoothness of the speed profile), and the last term $C_{obs}$ describes the total obstacle cost.

After the DP procedure, a DP speed profile 66b is obtained.

3) QP optimizes the cost function below to refine the DP Speed profile 66b:

$$C_{total}(S) = w_1 \int_{t_0}^{t_n} g(S - S_{ref}) dt + w_2 \int_{t_0}^{t_n} (S'')^2 dt + w_3 \int_{t_0}^{t_n} (S''')^2 dt$$

Where the first term measures the distance between the DP speed guidance profile $S_{ref}$ and generated path S. The variables S'' and S''' are the same as before.

In an embodiment, the QP optimization procedure is conducted in accordance with the following linearized constraints:

$$S(t_i) \leq S(t_{i+1}), i = 0, 1, 2, \ldots, n-1;$$

$$S_{l,t_i} \leq S(t_i) \leq S_{u,t_i};$$

$$S'(t_i) \leq V_{upper};$$

$$-Dec_{max} \leq Acc_{max};$$

$$-J_{max} \leq S'''(t_i) \leq J_{max}$$

Where the first constraint is monotonicity evaluated at designated points and the second, third, and fourth constraints are requirements from traffic regulations and vehicle dynamic constraints.

Finally, the QP procedure generates a smooth feasible speed profile 66c.

Operation 6: Path and Speed Profiles

Eventually, a path profile "l=f(s)" and speed profile "s=S(t)" will be obtained based on the current Frenet frame Operation 7: Cycle Depending on the scenarios or the final planning accuracy requirements, determine whether to jump to Operation 3. There may be many occurrences of such a jump. For example, there might be three cycles conducted.

Operation 8: Reference Line Trajectory Decider

Among all lane-level best trajectories above, a trajectory decider identifies a best trajectory based on the current car status, regulations and the cost of each trajectory.

Visualization of Intermediate Operations

Before the final trajectory is generated, several intermediate operations are typically conducted. Moreover, the configuration of many different parameters such as, for example, cost weights $w_1$, $w_2$, $w_3$, ..., obstacle cost parameters $d_n$, $d_c$, time axis segmentation granularities, thresholds, vehicle dynamics, etc.) may influence the intermediate operations.

To understand, for example, how many lines are generated in a single Frenet frame, suppose that:

1) there are two reference lines in Operation 1;
2) there are five point columns in Operation 3;
3) there are eleven points in each point column; and
4) there are three cycles Table II below illustrates the results.

TABLE II

| Operation | Result | Subtotal |
| --- | --- | --- |
| Generate reference line | 2 reference lines | 2 |
| Path Planning | $11^3 + 11^2$ candidate paths | 1452 |
| Cycle | 3 times | 3 |
| Total | $2 \times (11^3 + 11^2) \times 3$ | 8712 |

Overall, there would be about 8712 lines generated at least in one second, and the cost would be calculated for each line based on several parameters (e.g., cost weights, vehicle dynamics, regulations, and so forth). Accordingly, simply visualizing the final planning trajectory would be insufficient. Rather, visualizing the intermediate operations as described herein by using vector chart data with lifecycles would be valuable to accident investigation, scenario analysis, system calibration, and other activities. Moreover, the SL projection and ST projection would be updated many times in one second. Indeed, the SL Projection resolution (e.g., degree of discretization) and ST projection resolution may change, which typically depends on car speed, driving scenario, etc.

Figure 9:
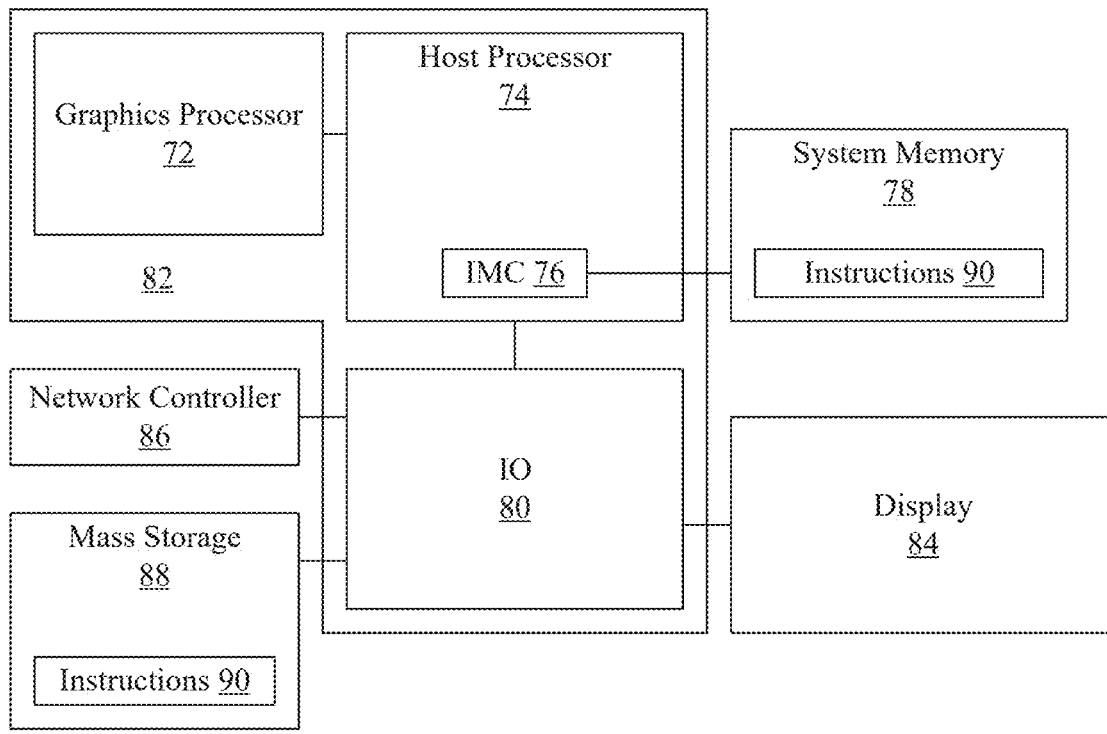
FIG. 9 is a block diagram of an example of a performance-enhanced computing system according to an embodiment.

Turning now to FIG. 9, a performance-enhanced computing system 70 is shown. The computing system 70 that may generally be part of an electronic device/system having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof. In the illustrated example, the system 70 includes a graphics processor 72 (e.g., graphics processing unit/GPU) and a host processor 74 (e.g., central processing unit/CPU) having an integrated memory controller (IMC) 76 that is coupled to a system memory 78.

Additionally, the illustrated system 70 includes an input output (IO) module 80 implemented together with the host processor 74 and the graphics processor 72 on an SoC 82 (e.g., semiconductor die). In one example, the IO module 80 communicates with a display 84, a network controller 86 (e.g., wired and/or wireless), and mass storage 88 (e.g., hard disk drive/HDD, solid state drive/SSD, optical disc, flash memory, etc.). In the illustrated example, the mass storage 88 and/or the system memory 78 include a set of instructions 90, which when executed by the IO module 80, the host processor 74 and/or the graphics processor 72, cause the computing system 70 to implement one or more aspects of the method 30 (FIG. 2), already discussed. Thus, execution of the illustrated instructions 90 cause the computing system 70 store data associated with a plurality of intermediate operations in an autonomous vehicle process, generate a visualization output based at least partly on the data, and change a magnification level of the visualization output based on user input. In such a case, the display 84 may present the visualization output. Alternatively, the network controller 86 may send the visualization output to another system and/or platform. In one example, the visualization output is generated further based on parameter input and the data includes vector chart data.

In an embodiment, the instructions 90, when executed, cause the computing system 70 to limit a display duration of one or more elements in the visualization output based on one or more of a temporal position of the element(s) or a candidacy status of the element(s). Additionally, the element(s) may correspond to one or more of candidate navigation paths or lattice points.

The computing system 70 may therefore be considered to be performance-enhanced because it enables the visualization output to be more advantageous to the end user. For example, during calibration of the autonomous vehicle, a developer might vary parameters and/or settings of the intermediate operations to determine the result of the autonomous vehicle process at intermediate stages of the autonomous vehicle process. Moreover, the underlying data used to generate the visualization output may be vector chart data encoded with additional information to facilitate zoom operations. In such a case, the user may readily change the magnification level of the visualization output to view the specifics of the intermediate operations at varying levels of detail (e.g., in connection with an investigation into a crash of the autonomous vehicle). In one example, a lifecycle is assigned to the elements of the visualization output to prevent the overlapping of a high number of visible elements for an extended period of time. Such an approach is particularly advantageous given the large data sets typically processed by an autonomous vehicle.

Figure 10:
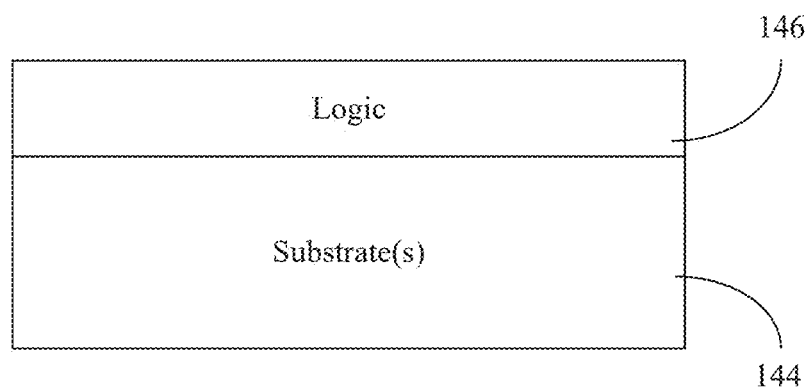
FIG. 10 is an illustration of an example of a semiconductor apparatus according to an embodiment.

FIG. 10 shows a semiconductor apparatus 140 (e.g., chip, die, package). The illustrated apparatus 140 includes one or more substrates 144 (e.g., silicon, sapphire, gallium arsenide) and logic 146 (e.g., transistor array and other integrated circuit/IC components) coupled to the substrate(s) 144. In an embodiment, the logic 146 implements one or more aspects of the method 30 (FIG. 2), already discussed. Thus, the logic 146 may store data associated with a plurality of intermediate operations in an autonomous vehicle process, generate a visualization output based at least partly on the data, and change a magnification level of the visualization output based on user input. In one example, the visualization output is generated further based on parameter input and the data includes vector chart data. In an embodiment, the logic 146 limits a display duration of one or more elements in the visualization output based on a temporal position of the element(s) and/or a candidacy status of the element(s). Additionally, the element(s) may correspond to candidate navigation paths and/or lattice points.

The logic 146 may therefore enable the visualization output to be more advantageous to the end user. For example, during calibration of the autonomous vehicle, a developer might vary parameters and/or settings of the intermediate operations to determine the result of the autonomous vehicle process at intermediate stages of the autonomous vehicle process. Moreover, the underlying data used to generate the visualization output may be vector chart data encoded with additional information to facilitate zoom operations. In such a case, the user may readily change the magnification level of the visualization output to view the specifics of the intermediate operations at varying levels of granularity/detail (e.g., in connection with an investigation into a crash of the autonomous vehicle). In one example, a lifecycle is assigned to the elements of the visualization output to prevent the overlapping of a high number of visible elements for an extended period of time. Such an approach is particularly advantageous given the large data sets typically processed by an autonomous vehicle.

The logic 146 may be implemented at least partly in configurable logic or fixed-functionality hardware logic. In one example, the logic 146 includes transistor channel regions that are positioned (e.g., embedded) within the substrate(s) 144. Thus, the interface between the logic 146 and the substrate(s) 144 may not be an abrupt junction. The logic 146 may also be considered to include an epitaxial layer that is grown on an initial wafer of the substrate(s) 174.

ADDITIONAL NOTES AND EXAMPLES

Example 1 includes a performance-enhanced computing system comprising a display to present a visualization output, a processor coupled to the display, and a memory coupled to the processor, the memory including a set of instructions, which when executed by the processor, cause the computing system to store data associated with a plurality of intermediate operations in an autonomous vehicle process, generate the visualization output based at least partly on the data, and change a magnification level of the visualization output based on user input.

Example 2 includes the computing system of Example 1, wherein the instructions, when executed, cause the computing system to limit a display duration of one or more elements in the visualization output based on a temporal position of the one or more elements in the autonomous vehicle process.

Example 3 includes the computing system of Example 1, wherein the instructions, when executed, cause the computing system to limit a display duration of one or more elements in the visualization output based on a candidacy status of the one or more elements.

Example 4 includes the computing system of Example 1, wherein the visualization output is to be generated further based on parameter input.

Example 5 includes the computing system of Example 1, wherein the autonomous vehicle process is one or more of a perception process, a prediction process, a planning process, a control process or a localization process.

Example 6 includes the computing system of Example 1, wherein the data is to be vector chart data.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to store data associated with a plurality of intermediate operations in an autonomous vehicle process, generate a visualization output based at least partly on the data, and change a magnification level of the visualization output based on user input.

Example 8 includes the semiconductor apparatus of Example 7, wherein the logic coupled to the one or more substrates is to limit a display duration of one or more elements in the visualization output based on a temporal position of the one or more elements in the autonomous vehicle process.

Example 9 includes the semiconductor apparatus of Example 7, wherein the logic coupled to the one or more substrates is to limit a display duration of one or more elements in the visualization output based on a candidacy status of the one or more elements.

Example 10 includes the semiconductor apparatus of Example 7, wherein the visualization output is to be generated further based on parameter input.

Example 11 includes the semiconductor apparatus of Example 7, wherein the autonomous vehicle process is one or more of a perception process, a prediction process, a planning process, a control process or a localization process.

Example 12 includes the semiconductor apparatus of any one of Examples 7 to 11, wherein the data is to be vector chart data.

Example 13 includes at least one computer readable storage medium comprising a set of instructions, which when executed by a computing system, cause the computing system to store data associated with a plurality of intermediate operations in an autonomous vehicle process, generate a visualization output based at least partly on the data, and change a magnification level of the visualization output based on user input.

Example 14 includes the at least one computer readable storage medium of Example 13, wherein the instructions, when executed, cause the computing system to limit a display duration of one or more elements in the visualization output based on a temporal position of the one or more elements in the autonomous vehicle process.

Example 15 includes the at least one computer readable storage medium of Example 13, wherein the instructions, when executed, cause the computing system to limit a display duration of one or more elements in the visualization output based on a candidacy status of the one or more elements.

Example 16 includes the at least one computer readable storage medium of Example 13, wherein the visualization output is to be generated further based on parameter input.

Example 17 includes the at least one computer readable storage medium of Example 13, wherein the autonomous vehicle process is one or more of a perception process, a prediction process, a planning process, a control process or a localization process.

Example 18 includes the at least one computer readable storage medium of any one of Examples 13 to 17, wherein the data is to be vector chart data.

Example 19 includes a method comprising storing data associated with a plurality of intermediate operations in an autonomous vehicle process, generating a visualization output based at least partly on the data, and changing a magnification level of the visualization output based on user input.

Example 20 includes the method of Example 19, further including limiting a display duration of one or more elements in the visualization output based on a temporal position of the one or more elements in the autonomous vehicle process.

Example 21 includes the method of Example 19, further including limiting a display duration of one or more elements in the visualization output based on a candidacy status of the one or more elements.

Example 21 includes the method of Example 20, wherein the one or more elements correspond to one or more of candidate navigation paths or lattice points.

Example 22 includes the method of Example 19, wherein the visualization output is generated further based on parameter input.

Example 23 includes the method of Example 19, wherein the autonomous vehicle process is one or more of a perception process, a prediction process, a planning process, a control process or a localization process.

Example 24 includes the method of any one of Examples 19 to 23, wherein the data is vector chart data.

Example 25 includes means for performing the method of any one of Examples 19 to 24.

Thus, technology described herein uses vector chart data to guarantee that the magnification and reduction of points and lines are accurate. Moreover, in an autonomous driving process, the system typically runs in infinite loops. Accordingly, the use of limited display durations as described herein eliminates intermediate generated points and lines that may otherwise overlap one another. In this regard, many points and lines are only calculated as the basis of the next operation and displaying all of them (e.g., candidate paths) may be superfluous.

Additionally, using vector chart data with lifecycles in the world coordinate system facilitates an easy understanding for developer or analysts. Such an approach will still visualize the necessary operations in the Frenet coordinate system. Moreover, deployment of the vector chart with lifecycle technology in the world coordinate system enables visualization playing speed to be defined (e.g., to playback a specific autonomous driving duration repeatedly to investigate accident or conduct system calibration).

For data that is not easily visualized, queries and comparison may be used. This type of data includes, for example, autonomous vehicle initial velocity, initial acceleration and/or dynamics, regulations, formula, system parameters, and so forth. For example, system parameters and other relevant variables (e.g, autonomous vehicle speed and acceleration) or relevant cost value calculation processes (e.g., candidate path cost value calculation) may be queried by the user.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C'" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
a display to present a visualization output;
a processor coupled to the display; and
a memory coupled to the processor, the memory including a set of instructions, which when executed by the processor, cause the computing system to:
store intermediate planning data associated with a plurality of intermediate operations used for planning of a trajectory of an autonomous vehicle, each intermediate operation of the plurality of intermediate operations included in an autonomous vehicle process, wherein the stored intermediate planning data includes vector chart data encoded with additional information for magnification operations;

generate the visualization output of the autonomous vehicle process based at least partly on creating a projection of the intermediate planning data associated with the intermediate operations, wherein the visualization output is generated as a vector chart that depicts multiple candidate navigation paths for the planning of the trajectory, and wherein the vector chart depicts the multiple candidate navigation paths with vectorized points and lines;

determine a display duration for each candidate navigation path of the multiple candidate navigation paths based on a respective candidacy status, wherein the respective candidacy status is determined based on real-time evaluation of trajectory feasibility in the autonomous vehicle process;

display, for the respective display duration, each candidate navigation path in the visualization output, wherein the respective display duration corresponds to temporal windows during which each candidate navigation path remains viable for trajectory planning; and change a magnification level of the visualization output based on user input of a user, to present the projection of the intermediate planning data with a changed magnification of the vectorized points and lines for assisting the user in a system calibration or in an investigation into an incident involving the autonomous vehicle.

2. The computing system of claim 1, wherein determining the display duration of each candidate navigation path of the multiple candidate navigation paths in the visualization output is further based on a temporal position of each candidate navigation path in the autonomous vehicle process.

3. The computing system of claim 1, wherein the visualization output is to be generated further based on parameter input.

4. The computing system of claim 1, wherein the plurality of intermediate operations that produce the intermediate planning data in the autonomous vehicle process occur in one or more of a perception process, a prediction process, a planning process, a control process, or a localization process.

5. A semiconductor apparatus comprising:
one or more substrates; and
logic coupled to the one or more substrates, wherein the logic is implemented at least partly in one or more of configurable logic or fixed-functionality hardware logic, the logic coupled to the one or more substrates to:
store intermediate planning data associated with a plurality of intermediate operations used for planning of a trajectory of an autonomous vehicle, each intermediate operation of the plurality of intermediate operations included in an autonomous vehicle process, wherein the stored intermediate planning data includes vector chart data encoded with additional information for magnification operations;

generate a visualization output of the autonomous vehicle process based at least partly on creating a projection of the intermediate planning data associated with the intermediate operations, wherein the visualization output is generated as a vector chart that depicts multiple candidate navigation paths for the planning of the trajectory, and wherein the vector chart depicts the multiple candidate navigation paths with vectorized points and lines;

determine a display duration for each candidate navigation path of the multiple candidate navigation paths based on a respective candidacy status, wherein the respective candidacy status is determined based on real-time evaluation of trajectory feasibility in the autonomous vehicle process;

display, for the respective display duration, each candidate navigation path in the visualization output, wherein the respective display duration corresponds to temporal windows during which each candidate navigation path remain viable for trajectory planning; and change a magnification level of the visualization output based on user input of a user, to present the projection of the intermediate planning data with a changed magnification of the vectorized points and lines for assisting the user in a system calibration or in an investigation into an incident involving the autonomous vehicle.

6. The semiconductor apparatus of claim 5, wherein the logic coupled to the one or more substrates is to determine the display duration of each candidate navigation path of the multiple candidate navigation paths in the visualization output based on a temporal position of each candidate navigation path in the autonomous vehicle process.

7. The semiconductor apparatus of claim 5, wherein the visualization output is to be generated further based on parameter input.

8. The semiconductor apparatus of claim 5, wherein the plurality of intermediate operations that produce the intermediate planning data in the autonomous vehicle process occur in one or more of a perception process, a prediction process, a planning process, a control process, or a localization process.

9. At least one non-transitory computer readable storage medium comprising a set of instructions, which when executed by a computing system, cause the computing system to:
store intermediate planning data associated with a plurality of intermediate operations used for planning of a trajectory of an autonomous vehicle, each intermediate operation of the plurality of intermediate operations included in an autonomous vehicle process, wherein the stored intermediate planning data includes vector chart data encoded with additional information for magnification operations;

generate a visualization output of the autonomous vehicle process based at least partly on creating a projection of the intermediate planning data associated with the intermediate operations, wherein the visualization output is generated as a vector chart that depicts multiple candidate navigation paths for the planning of the trajectory, and wherein the vector chart depicts the multiple candidate navigation paths with vectorized points and lines;

determine a display duration for each candidate navigation path of the multiple candidate navigation paths based on a respective candidacy status, wherein the respective candidacy status is determined based on real-time evaluation of trajectory feasibility in the autonomous vehicle process;

display, for the respective display duration, each candidate navigation path in the visualization output, wherein the respective display duration corresponds to temporal windows during which each candidate navigation path remain viable for trajectory planning; and change a magnification level of the visualization output based on user input of a user, to present the projection of the intermediate planning data with a changed magnification of the vectorized points and lines for assisting the user in a system calibration or in an investigation into an incident involving the autonomous vehicle.

10. The at least one non-transitory computer readable storage medium of claim 9, wherein the set of instructions, when executed, cause the computing system to determine the display duration of each candidate navigation path of the multiple candidate navigation paths in the visualization output based on a temporal position of each candidate navigation path in the autonomous vehicle process.

11. The at least one non-transitory computer readable storage medium of claim 9, wherein the visualization output is to be generated further based on parameter input.

12. The at least one non-transitory computer readable storage medium of claim 9, wherein the plurality of intermediate operations that produce the intermediate planning data in the autonomous vehicle process occur in one or more of a perception process, a prediction process, a planning process, a control process, or a localization process.

13. A method comprising:

storing intermediate planning data associated with a plurality of intermediate operations used for planning of a trajectory of an autonomous vehicle, each intermediate operation of the plurality of intermediate operations included in an autonomous vehicle process, wherein the stored intermediate planning data includes vector chart data encoded with additional information for magnification operations;

generating a visualization output of the autonomous vehicle process based at least partly on creating a projection of the intermediate planning data associated with the intermediate operations, wherein the visualization output is generated as a vector chart that depicts multiple candidate navigation paths for the planning of the trajectory, and wherein the vector chart depicts the multiple candidate navigation paths with vectorized points and lines;

determining a display duration for each candidate navigation path of the multiple candidate navigation paths based on a respective candidacy status, wherein the respective candidacy status is determined based on real-time evaluation of trajectory feasibility in the autonomous vehicle process;

displaying, for the respective display duration, each candidate navigation path in the visualization output, wherein the respective display duration corresponds to temporal windows during which each candidate navigation path remains viable for trajectory planning; and changing a magnification level of the visualization output based on user input of a user, to present the projection of the intermediate planning data with a changed magnification of the vectorized points and lines for assisting the user in a system calibration or in an investigation into an incident involving the autonomous vehicle.

14. The method of claim 13, wherein determining the display duration of each candidate navigation path of the multiple candidate navigation paths in the visualization output is based on a temporal position of each candidate navigation path in the autonomous vehicle process.

15. The method of claim 13, wherein the visualization output is generated further based on parameter input.

16. The method of claim 13, wherein the plurality of intermediate operations that produce the intermediate planning data in the autonomous vehicle process occur in one or more of a perception process, a prediction process, a planning process, a control process, or a localization process.

* * * * *